3,577,247
MAGNESIUM ALUMINATE SPINEL
BONDED REFRACTORY
Bernard D. McKenna, San Jose, Calif., assignor to Kaiser Aluminum & Chemical Corporation, Oakland, Calif.
No Drawing. Filed Nov. 25, 1968, Ser. No. 778,756
Int. Cl. C04b 35/44
U.S. Cl. 106—62                                  7 Claims

ABSTRACT OF THE DISCLOSURE

A magnesium aluminate spinel bonded shape is made by admixing refractory grain retained on a 100 mesh screen with magnesium aluminate grain passing a 100 mesh screen and containing up to three moles of magnesia for each mole of alumina, and sufficient −100 mesh alumina to react with the −100 mesh magnesium aluminate grain to form a matrix containing not over 1.25 moles of magnesia for each mole of alumina, and firing the admixture after forming it into a shape.

BACKGROUND OF THE INVENTION

This invention concerns refractories and particularly refractories which are bonded by magnesium aluminate spinel.

The use of magnesium aluminate spinel as a refractory material has been known for many years, but such refractories have not received widespread use. Some of the reasons for this can be found in the problems of manufacturing such refractories.

For example, it is known to mix magnesia (MgO) and alumina ($Al_2O_3$) in the stoichiometric portions required to form magnesium aluminate spinel ($MgAl_2O_4$), forming this admixture into shapes and then firing the shapes. In this approach, the chemical reaction between the magnesia and alumina to form the magnesium aluminate spinel takes place during the firing of the refractory shape. However, it has been found that the volume change taking place concurrently with the reaction of forming spinel is so large that it tends to disrupt the refractory shape. Thus, it is very difficult, by this method, to make a magnesium aluminate spinel shape which is sound and strong after firing.

Alternatively, it has been known to form magnesium aluminate spinel grain by admixing and firing magnesia and alumina in stoichiometric proportions. This grain is then sized, formed into shapes, and fired a second time. However, in this approach it has been found very difficult to secure a magnesium aluminate spinel grain of acceptably low porosity. Apparently, for some reason, magnesia and alumina in 1:1 mole ratio are very difficult to sinter to a low porosity at commercially available temperatures.

The present invention overcomes the foregoing problems associated with the production of a magnesium aluminate spinel shape.

SUMMARY OF THE INVENTION

It has now been found, according to this invention, that a strong, coherent refractory shape bonded by magnesium aluminate spinel can be made by (1) admixing a magnesia yielding material and an alumina yielding material in proportions to yield, on the ignited basis, more than one mole and less than three moles of magnesia for each mole of alumina; (2) firing said admixture to form a refractory grain containing over 50 weight percent magnesium aluminate spinel; (3) crushing and grinding said grain to brick-making sizes, the major portion of the grain being retained on a 100 mesh screen and a minor portion passing a 100 mesh screen; (4) admixing the grain produced in step (3) with sufficient alumina passing a 100 mesh screen, at least 80% by weight of said alumina passing a 325 mesh screen, to provide, in the portion of the admixture passing a 100 mesh screen, a mole ratio of magnesia to alumina not over 1.25:1; (5) forming the admixture produced in step (4) into a shape; and (6) firing said shape, preferably to a temperature of at least 1350° C., and most preferably to 1600° C. or higher.

Alternatively, it is possible to substitute other compatible, nonacid refractory grain such as periclase or alumina for all or part of the magnesium aluminate spinel grain retained on a 100 mesh screen. When such substitution is made, it is preferred that it be confined to that portion of the grain retained on a 40 mesh screen. In other words, if other compatible grain is substituted for the coarse magnesium aluminate spinel grain, it is preferred that all the grain passing a 40 mesh screen be magnesium aluminate spinel made in accordance with this invention; in any case, all the grain passing a 100 mesh screen will be such grain, together with the added alumina.

DETAILED DESCRIPTION

The magnesia yielding material can be any such material, but will preferably be one which yields at least 95%, and most preferably 98%, MgO upon firing. For example, it can be a naturally occurring material such as a magnesium carbonate or it can be a synthetically produced material such as a magnesium hydroxide produced by reacting a magnesium salt solution such as sea water or naturally occurring brines or bitterns with lime, hydrated lime, or caustic soda. It can also be magnesia itself. A particularly suitable form of magnesia is lightly calcined magnesia, i.e., one which has been formed by calcining magnesium hydroxide, magnesium carbonate, or the like, at such a temperature, for example from 600 to 1100° C., that magnesia in a highly reactive state is formed.

The alumina yielding material can also be any such material, but again preferably will be one which yields at least 95%, and most preferably 98%, alumina upon firing. It can be an aluminum compound such as aluminum hydroxide, for example the material produced by the Bayer process for producing alumina, or it can be alumina itself, either calcined at a relatively high temperature to form the material known as tabular alumina or calcined at a lower temperature to form a more reactive alumina.

The magnesia yielding and alumina yielding materials are admixed in such proportion that there is an excess of magnesia, on the fired basis, over that required to form stoichiometric magnesium aluminate spinel. The amount of excess magnesia should be limited so that the magnesia in excess of that required to form a stoichiometric spinel with the alumina present is less, on a weight basis, than the amount of stoichiometric spinel which could be formed in the resulting grain. Preferably the amount of magnesia will be limited so that there are not more than three moles of magnesia for each mole of alumina in the admixture. This first admixture is fired to form a reacted refractory material containing a predominant proportion of magnesium aluminate, together with excess magnesia. If desired, the admixture can be compacted before firing. The firing can be carried out, for example, in a rotary kiln or in a shaft kiln or any other suitable means.

It has been found that, when excess magnesia is present in the mixture from which the magnesium aluminate spinel grain is made, the grain, after firing, has a much lower porosity than grain made from a stoichiometric mixture of magnesia and alumina fired to the same temperature.

After the magnesium aluminate spinel grain is formed, it is crushed and sized to make a brickmaking size graded grain, as is well known in the art. As is also well known to those skilled in the art, such a brickmaking mix contains a major portion, i.e., over 50% by weight, preferably at least 60%, material retained on a 100 mesh screen and a minor proportion, i.e., less than 50% by weight, and typically about 25 to 35% by weight, material passing a 100 mesh screen. Of the portion of the grain passing a 100 mesh screen, a major portion passes a 325 mesh screen.

The alumina to be admixed with the magnesium aluminate grain can be any such material, but preferably contains at least 95% alumina. A particularly suitable material is calcined alumina with which has been blended a small amount, for example about 3% by weight, of titania ($TiO_2$), as is set forth more fully in U.S. Pat. 3,184,322. The added alumina will be finely divided, all of it passing a 100 mesh screen and at least 80%, preferably about 90%, passing a 325 mesh screen, all percentages being by weight. Preferably from 2% to 15%, by weight of the total brick batch, of added alumina will be used.

It can be seen that, by the method of this invention, there results a refractory shape comprising coarse magnesium aluminate spinel grain containing a substantial excess of magnesia (together with or replaced by, if desired, other compatible coarse grain), said coarse grain being bonded by a matrix comprising magnesium aluminate spinel with very little, if any, excess magnesia. This has several advantages. First, as mentioned above, by forming the grain with an excess of magnesia, it is possible to obtain a dense, low porosity grain. Second, by prereacting the grain, it is possible to overcome the problems associated with the volume change upon reaction to form the magnesium aluminate when the brick itself is fired. It will be understood that a magnesium aluminate forming reaction does take place during firing of the brick, but since this is confined to a relatively small proportion of the matrix material, the matrix material being in itself only a minor part of the brick, the total volume change involved is so small that it does not cause rupturing of the brick. Further, as has heretofore been recognized, magnesium aluminate grain with excess magnesia, particularly such grain in finely divided form, is susceptible to hydration, a highly undesirable effect in refractory materials, particularly refractory shapes. However, the shape of the present invention overcomes the hydration problem since the matrix, being the finely divided material in the brick mix, is close to stoichiometric magnesium aluminate spinel. At the same time, excess magnesia in the coarse fraction of the brick imparts to the brick the resistance to penetration by iron associated with magnesia refractories. In addition, the brick also exhibit the relatively low thermal conductivity and low thermal expansion of magnesium aluminate.

EXAMPLE

Calcined alumina, formed by calcining aluminum hydroxide at a temperature of about 1250° C. was blended with lightly calcined magnesia, formed by calcining magnesium hydroxide produced from sea water at a temperature of about 950° C., in proportions to yield equal weight amounts of alumina and magnesia. The admixture was compacted into pellets in a roll press and the pellets fired in a rotary kiln at a temperature of about 1900° C. The fired grain had the following chemical analysis: 49.0% $Al_2O_3$, 0.2% $SiO_2$, 0.2% $Fe_2O_3$, 0.4% CaO, 0.2% $B_2O_3$, and (by difference) 50.0% MgO.

The grain thus formed was crushed to pass a 3 mesh screen, 22.5% of it passing a 100 mesh screen. With 91 parts of this grain were admixed 7.5 parts of a blend of calcined alumina, made by calcining aluminum hydroxide produced by the Bayer process at a temperature of about 1250° C., and titania ($TiO_2$) in the proportions of 97.1 parts alumina to 2.9 parts titania. The blend of alumina and titania was 94% −325 mesh and only 1% was retained on a 150 mesh screen. To the admixture of spinel and alumina were added 0.75 part $CrO_3$ and 0.75 part of a lignin sulfonate binder, the latter two materials being included to provide strength to the refractory shape prior to firing.

The admixture was pressed into brick at 10,000 p.s.i., the brick being dried overnight at 150° C. and fired in a tunnel kiln at a temperature of about 1700° C. After drying, the shapes had a bulk density of 184 p.c.f. (pounds per cubic foot) and after firing, 192 p.c.f. The shapes showed a volume shrinkage of 5.5 volume percent upon firing. When tested for modulus of rupture strength after firing, the shapes had the following strengths at the temperatures indicated: room temperature, 3357 p.s.i.; 1260° C., 1139 p.s.i.; and 1482° C., 516 p.s.i. The shapes showed a linear thermal expansion, upon heating to 1500° C., of slightly less than 1.5%. This is to be compared to an expansion of slightly over 2% for a 98% MgO brick and of 1.3% for a 100% $Al_2O_3$ brick.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw-Hill Book Company, at page 963. For example, a 100 mesh screen opening corresponds to 147 microns, and 200 mesh to 74 microns. Analyses of mineral components are reported in the usual manner, expressed as simple oxides, e.g. MsO, $SiO_2$ although the components may actually be present in various combinations, e.g., as a magnesium silicate.

Having now described the invention, what is claimed is:

1. Method of making fired spinel bonded refractory shapes comprising: (1) admixing a magnesia yielding material and an alumina yielding material in such proportions that the mixture, on the ignited basis, contains more than 1 mole and less than 3 moles of magnesia for each mole of alumina; (2) firing said admixture to form grain containing over 50 weight percent magnesium aluminate spinel, based on the total weight of the grain; (3) sizing said grain so that it passes a 100 mesh screen, with a major portion passing a 325 mesh screen; (4) admixing the grade sized grain formed in step (3) with over 50% by weight, based on the total weight of the admixture, of coarse refractory grain retained on a 100 mesh screen, a portion of said coarse grain being retained on a 40 mesh screen, and from about 2% to about 15% by weight, based on the total weight of the admixture, of finely divided alumina, all of which passes a 100 mesh screen and at least 80% of which passes a 325 mesh screen; (5) forming the admixture formed in step (4) into shape; and (6) firing said shape.

2. Method according to claim 1 wherein the coarse refractory grain retained on a 100 mesh screen, but passing a 40 mesh screen, is a magnesium aluminate spinel grain made according to steps (1) and (2).

3. Method according to claim 1 or 2 wherein the said grain passing a 100 mesh screen contains about 2.5 moles of MgO for each mole of $Al_2O_3$ and wherein there is admixed with said grain passing a 100 mesh screen about 7.5%, by weight of the total admixture, finely divided $Al_2O_3$.

4. A refractory composition consisting essentially of: (1) refractory grain of brickmaking grade sizing, at least 60% of which is retained on a 100 mesh screen, the remainder passing a 100 mesh screen, said grain passing a 100 mesh screen containing at least 95% MgO and $Al_2O_3$ and containing more than 1 mole and less than 3 moles of MgO for each mole of $Al_2O_3$; and (2) from about 2% to about 15% by weight, based on the total composition, of finely divided $Al_2O_3$ all of which passes a 100 mesh screen and at least 80% of which passes a 325 mesh screen.

5. Composition according to claim 4 wherein said refractory grain passing a 100 mesh screen contains at least 98% MgO and $Al_2O_3$.

6. Composition according to claim 5 wherein said refractory grain passing a 100 mesh screen contains about 2.5 moles of MgO for each mole of $Al_2O_3$ and said composition contains about 7.5% by weight of finely divided $Al_2O_3$.

7. Composition according to any one of claims 4, 5 and 6 wherein the refractory grain retained on a 100 mesh screen contains at least 95% MgO and $Al_2O_3$ and contains more than one mole and less than three moles of MgO for each mole of $Al_2O_3$.

References Cited

UNITED STATES PATENTS

| | | | |
|---|---|---|---|
| 2,618,566 | 11/1952 | Robinson | 106—62 |
| 2,805,167 | 9/1957 | McCreight et al. | 106—62 |
| 3,184,322 | 5/1965 | Parikh et al. | 106—62 |
| 3,333,971 | 8/1967 | McKenna | 106—62 |

JAMES E. POER, Primary Examiner

U.S. Cl. X.R.

106—65